United States Patent
Tamura et al.

(10) Patent No.: US 12,459,084 B2
(45) Date of Patent: Nov. 4, 2025

(54) WORKING DEVICE

(71) Applicant: Koki Holdings Co., Ltd., Tokyo (JP)

(72) Inventors: Kengo Tamura, Ibaraki (JP); Junichi Toukairin, Ibaraki (JP); Shota Takeuchi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 382 days.

(21) Appl. No.: 18/009,474

(22) PCT Filed: Jun. 11, 2021

(86) PCT No.: PCT/JP2021/022240
§ 371 (c)(1),
(2) Date: Dec. 9, 2022

(87) PCT Pub. No.: WO2022/004330
PCT Pub. Date: Jan. 6, 2022

(65) Prior Publication Data
US 2023/0147598 A1 May 11, 2023

(30) Foreign Application Priority Data
Jun. 30, 2020 (JP) ................................ 2020-112437

(51) Int. Cl.
*B25B 21/00* (2006.01)
*B25B 23/18* (2006.01)
*B25F 5/02* (2006.01)

(52) U.S. Cl.
CPC ............. *B25B 21/00* (2013.01); *B25B 23/18* (2013.01); *B25F 5/02* (2013.01)

(58) Field of Classification Search
CPC .. B25F 5/00; B25F 5/001; B25F 5/008; B25F 5/02; B25B 21/00; B25B 21/002;
(Continued)

(56) References Cited

U.S. PATENT DOCUMENTS

| 8,800,412 | B2 * | 8/2014 | Griffin | .................. | F16B 7/0493 |
| | | | | | 403/236 |
| 2014/0371018 | A1 * | 12/2014 | Ito | ........................... | B25B 21/02 |
| | | | | | 475/149 |

(Continued)

FOREIGN PATENT DOCUMENTS

| JP | 2008-062338 A | 3/2008 |
| JP | 2012-139748 A | 7/2012 |

(Continued)

OTHER PUBLICATIONS

International Search Report issued in corresponding International Application No. PCT/JP2021/022240, dated Aug. 31, 2021 w/English Translation (5 pages).

*Primary Examiner* — Robert J Scruggs
(74) *Attorney, Agent, or Firm* — Rimon P.C.

(57) ABSTRACT

In a working device, a cover added outside an enclosure portion is used to utilize vibration of the working device during an operation thereof to cool the enclosure portion. The working device has: a motor; a speed reduction mechanism for decelerating rotation of the motor; a striking mechanism; an enclosure portion (main body housing, hammer case 5) accommodating them; and a cover covering at least a portion of an outer surface of the enclosure portion. An airflow passage is formed between an outer surface of the hammer case and the cover and is configured so as to allow inflow and outflow of outside air. The cover is held so as to be slightly movable by sandwiching an elastic member in an axial line direction and, by the cover being moving forward and backward during its operation, air goes into or comes out of the airflow passage to cool the hammer case.

16 Claims, 8 Drawing Sheets

(58) Field of Classification Search
CPC ..... B25B 21/008; B25B 21/02; B25B 21/026;
B25B 19/00; B25B 23/02; B25B 23/14;
B25B 23/18; B25B 23/147; B25C 1/00;
B25C 13/00; B25D 1/00; B25D 9/125;
B25D 17/22; B25D 17/32; H02K 11/25;
H02K 5/20; H02K 7/145; H02K 9/04;
H02P 29/60
See application file for complete search history.

(56) References Cited

U.S. PATENT DOCUMENTS

| | | | |
|---|---|---|---|
| 2018/0001444 A1* | 1/2018 | Matsushita | ............. B25B 23/18 |
| 2018/0104810 A1 | 4/2018 | Ito | |
| 2020/0047322 A1 | 2/2020 | Ito | |
| 2022/0134527 A1 | 5/2022 | Ito | |

FOREIGN PATENT DOCUMENTS

| | | |
|---|---|---|
| JP | 2014-240115 A | 12/2014 |
| JP | 2019-000982 A | 1/2019 |
| WO | 2016/121463 A1 | 8/2016 |

* cited by examiner

EXHAUST OPERATION

WORKING DEVICE

CROSS REFERENCE TO RELATED APPLICATIONS

This application is the U.S. National Phase under 35 U.S.C. § 371 of International Application No. PCT/JP2021/022240, filed on Jun. 11, 2021, which claims the benefit of Japanese Application No. 2020-112437, filed on Jun. 30, 2020, the entire contents of each are hereby incorporated by reference.

TECHNICAL FIELD

The present invention relates to a working device having a cover that covers at least a part of an outer surface of an enclosure portion.

BACKGROUND ART

A working device, which has a drive unit generating a drive force, an energy supply unit supplying energy such as electric power, and a power transmission unit driven by the drive unit, is configurated so that the drive unit, the energy supply unit, and the power transmission unit are accommodated in an enclosure and cannot contact with an interior of the enclosure. The enclosure is often made of a synthetic resin or metal as a material. In addition, when a mechanism inside the enclosure is accompanied by heat generation, a cooling mechanism by a cooling fan may be provided or a protective cover may be attached outside a heat generating portion of the enclosure so that an operator does not feel uncomfortable in touching an exterior of the enclosure. Such a known technique is disclosed in, for example, Patent Document 1. Patent Document 1 discloses that cooling air, which is sucked into a main body by a fan for cooling a motor, flows between a case and a cover, thereby cooling the case.

RELATED ART DOCUMENTS

Patent Documents

Patent Document 1: International Publication No. WO 2016/121463

SUMMARY OF THE INVENTION

Problems to be Solved by the Invention

In recent years, as an output of a drive unit of a working device is increased, it has become important to take measures against heat generation. For example, a working device such as an impact device has a main housing made of a synthetic resin and a metal case, but a problem arises about taking measures against a temperature rise in a metal case portion as an output of a motor increases. In particular, when some kind of electronic component such as an LED (light emitting diode) is mounted in the vicinity of the case of the heat generating portion, heat countermeasures against the electronic components becomes also an important problem. In Patent Document 1, cooling air for cooling a motor is used to cool the metal case and the vicinity of the LED. That is, the cooling fan rotated by the motor cools the motor by the cooling air sucked from a rear end portion of the enclosure, and the subsequent cooling air is used to cool a metal case portion. However, such a cooling method cannot obtain a sufficient cooling effect since a flow rate of the cooling air flowing a periphery of the case decreases when the metal case and the fan separate from each other.

The present invention has been made in view of the above background, and an object of the present invention is to provide a working device capable of suppressing an excessive temperature rise of an enclosure portion with a simple configuration. Another object of the present invention is to provide a working device in which a cooling mechanism is provided outside a metal portion on the enclosure portion.

Still another object of the present invention is to provide a working device in which a cover added outside the enclosure portion is used and the enclosure portion is cooled by utilizing vibration of the working device during an operation.

Means for Solving the Problems

The following is a description of typical features of the invention disclosed in the present application.

According to one feature of the present invention, a working device includes: a drive unit that generates a driving force; an energy supply unit that supplies energy to the drive unit; a power transmission unit that is driven by the drive unit; an enclosure portion accommodating the drive unit, the energy supply unit, and the power transmission unit; and a cover portion that covers at least a part of an outer surface of the enclosure portion, and the working device has an airflow passage configured to allow an inflow and an outflow of outside air by being opened and closed between the outer surface of the housing portion and the cover portion. Also, the airflow passage has: first and second vents that open outside the working device; and a passage portion that connects the first and second vents between an outer surface of the enclosure portion and an inner surface of the cover portion. At least one of the first and second vents is configured by a gap formed between the outer surface of the enclosure portion and the cover portion or is configured by a through hole penetrating inner and outer surfaces of the cover portion. Incidentally, the cover portion and the airflow passage are provided at least one of a position corresponding to the power transmission unit, a position corresponding to the energy supply unit, or a position corresponding to the drive unit.

According to another feature of the present invention, in a working device having a housing accommodating the drive unit, and a case connected to a front of the housing and accommodating the power transmission unit, the cover portion is configured to cover the case, a first vent and a second vent that communicate with an outer portion of the enclosure portion are provided between the cover portion and the enclosure portion or at at least one of the cover portion and the enclosure portion, and air sucked from the first vent passes between the cover portion and the enclosure portion and is exhausted from the second vent. The housing accommodates a fan driven by the drive unit, the fan sucks fan air (outside air) from a third vent provided in the housing, and the fan air is exhausted from a fourth vent provided in the enclosure portion. The cover portion is supported so as to be movable at least in an axial direction of the drive unit with respect to the case and, by the cover portion moving in the axial direction, air is sucked from the first vent.

According to sill another feature of the present invention, in the case of the working device, a board provided with an LED element is supported so as to be movable at least in an axial direction of the drive unit with respect to the case and, by the board moving in the axial direction, air is sucked from the first vent. An energizing member for energizing the board on a side of the case is provided between the case and the board and, by movement of the energizing member due to vibration generated during a working operation, air is sucked from the first vent. Incidentally, the drive unit of such a working device may be configured by an electric motor using electric power as an energy source, and the energy supply unit may be configured as a power supplying unit for supplying electric power to the electric motor. The power supplying unit is supplied with power from a detachable battery pack. The drive unit may be configured by using compressed air as an energy source, and the energy supply unit may be configured as a compressed air supply unit for supplying the compressed air. The drive unit may be configured by an internal combustion engine using fuel as an energy source, and the energy supply unit may be configured as a fuel supply unit for supplying the fuel to the internal combustion engine.

Effects of the Invention

According to the present invention, an airflow passage is formed between the outer surface of the enclosure portion and the cover portion of the working device, and the volume of the airflow passage is increased or decreased by the cover portion moved by the reaction or vibration during the operation of the working device, and outside air is configured to flow in or out the working device, so that an excessive temperature rise of the enclosure portion can be suppressed. Further, since the airflow passage for cooling the case does not communicate with the inside of the enclosure, there is no concern that grease may leak from the enclosure portion.

DETAILED DESCRIPTION OF PREFERRED EMBODIMENTS

First Embodiment

Hereinafter, embodiments of the present invention will be described with reference to the drawings. Incidentally, in the following figures, the same components are denoted by the same reference numerals, and a repetitive description thereof will be omitted. Further, in the present specification, front-back and up-down directions will be described as directions shown in the figures.

Figure 1:
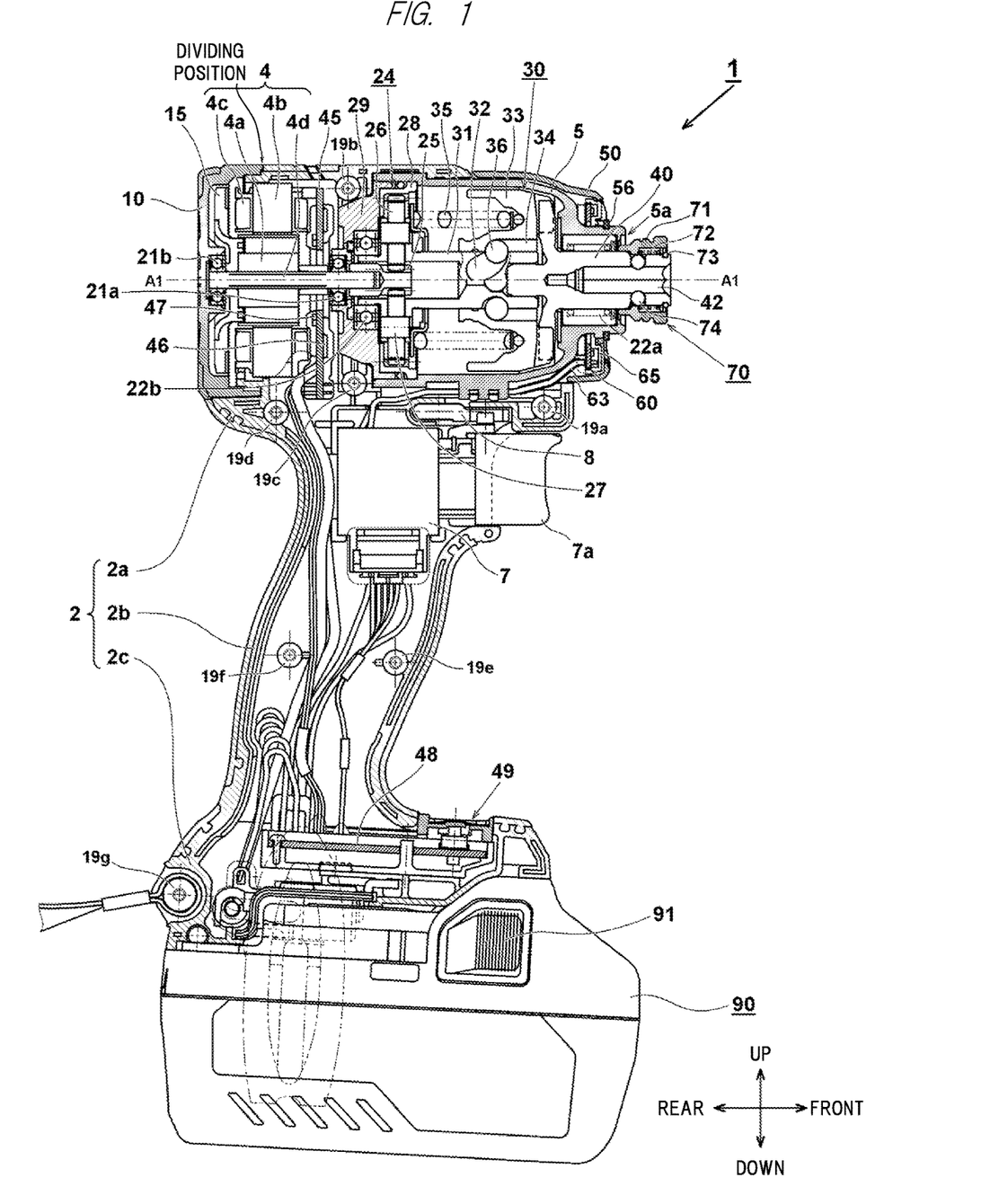
FIG. 1 is a vertical sectional view showing an internal structure of an impact device 1 according to an embodiment of the present invention.

FIG. 1 is a vertical sectional view showing an internal structure of an impact device 1 according to an embodiment of the present invention. An impact device 1: uses a rechargeable battery 90 as a power source; drives a striking mechanism 30 using a motor 4 as a drive source; converts rotation of a rotating member into an intermittent striking force in a rotational direction by the striking mechanism 30; and rotates a tip tool holding unit 70 coupled to the striking mechanism 30. An enclosure (housing) of the impact device 1 is configured by a main body housing 2 (2a, 2b, 2c) made of a synthetic resin, a metal hammer case 5 for accommodating the striking mechanism 30, and a rear cover 10.

The main body housing 2 is composed of three parts, that is, a body part 2a formed in a cylindrical shape, a handle part 2b which is a part held by an operator with one hand, and a battery attaching part 2c for attaching a detachable battery 90. The handle part 2b extends downward so as to be substantially orthogonal to a central axis (rotational axis A1) of the body part 2a, and an operation lever (trigger lever 7a) of a trigger switch 7 for controlling an ON-state or OFF-state of a motor is provided at a position of an index finger of the operator gripping the main body housing. A forward/reverse switching lever 8 for switching the rotational direction of the motor is provided above a rear of the trigger lever 7a. The trigger switch 7 turns on the rotation of the motor 4 by an operation of pulling the trigger lever 7a with a finger, that is, by an operation of moving the trigger lever 7a to a rear side, and turns off the rotation of the motor by releasing a pulling operation of the trigger lever 7a. Incidentally, a type and structure of the trigger switch 7 are arbitrary, and not only a working device having the slide-type trigger lever 7a but also any switch mechanism such as a switch having a swing-type trigger lever that swings around a swing axis or a touch button type switch may be used.

The hammer case 5 has a tapered cup shape, which forms a large opening on a rear side (opening 5f described later in FIG. 4) and a small opening (through hole 5a) through which an anvil 40 penetrates at a center of a front end side, the small opening becoming a bottom. The hammer case 5 is fixed by being sandwiched by the body part 2a of the left-right split type main body housing 2. The motor 4, a speed reduction mechanism 24 using planetary gears, and the striking mechanism 30 are arranged alongside in the cylindrical body part 2a on an axis coaxial with a rotational axis A1. The speed reduction mechanism 24 and the striking mechanism 30 serve as a power transmission unit of the present embodiment.

The battery attaching part 2c for attaching the battery 90 is formed at a lower portion inside the handle part 2b. The battery attaching part 2c is a diameter-expanded portion formed so as to extend in a radial direction (orthogonal direction) from a central axis in a longitudinal direction of the handle part 2b, and the battery 90 is attached on the lower side of the battery attaching part 2c. The battery 90 is a secondary battery using a lithium-ion battery widely used in power tools. That is, the working device (impact device 1) of the present embodiment uses electric power from the battery 90 as an energy source.

A type and shape of the battery 90 are arbitrary. The battery 90 can be removed from the main body housing 2 by relatively moving the battery 90 on a front side with respect to the main body housing 2 while a release button 91 is pushed in the main body housing from a state shown in FIG.

1. Incidentally, a power source of the impact device 1 of the present embodiment is arbitrary and, instead of using the battery 90 as a power source, electric power from a commercial power source may be used as an energy source via an AC power cable.

The main body housing 2 is made of a synthetic resin manufactured in a two-part division format rightward and leftward, and is fixed by using a plurality of screws. A plurality of screw bosses 19a to 19g for screwing are formed on one side (left side) of the main body housing 2, and a plurality of screw holes (not shown) for passing the screws are formed on the other side (right side).

Inside the battery attaching part 2c of the main body housing 2 and on an upper side of the battery 90, a control circuit board 48 on which a circuit for controlling a speed of the motor 4 by a pulling operation of the trigger lever 7a is mounted is accommodated. The control circuit board 48 is arranged in a direction substantially perpendicular to a longitudinal central axis of the handle part 2b, and mounts a unshown microcomputer. Further, a switch holder 49 is provided on an upper surface of the battery attaching part 2c, and various operation buttons such as a striking strength setting button and a remaining amount check button of the battery 90, and indicator lamps corresponding to them are arranged on the switch holder 49.

A brushless DC motor is used for the motor 4, and is driven by an exciting current generated by an inverter circuit. The rotating shaft 4d of the motor 4 is arranged so that a rotational axis A1 extends in the longitudinal direction of the body part 2a. A stator of the motor 4 is configured by: a stator core 4b which is formed of a laminated iron core(s) and in which a plurality of magnetic pole pieces are formed; and a coil 4c wound around each tooth of the stator core 4b. The rotor 4a forms a magnetic path(s) by a permanent magnet(s) accommodated inside the laminated iron core.

A cooling fan 15 is provided on a rear side in an axial direction of the motor 4 and coaxially with a rotating shaft 4d. The cooling fan 15 rotates in synchronization with the motor 4 to suck outside air from an air intake port 17 (see FIG. 2 for reference numerals) near a center of the body part 2a of the main body housing 2, and cools the motor 4 to then discharge it from an unshown air outlet port 18 (see FIG. 2 for reference numerals) formed on an outer circumferential side of the cooling fan 15. The rotating shaft 4d of the motor 4 is pivotally supported by a bearing 21a on a front side of the stator core 4b and a bearing 21b on a rear side thereof.

A drive circuit board 45 is arranged in front of the motor 4 in the axial direction and between the stator core 4b and an inner cover 29. The drive circuit board 45 mounts an inverter circuit composed of: three magnetic detection means 47 for detecting a magnetic field of a permanent magnet included in the rotor; and six semiconductor switching elements 46 such as an FET (Field effect transistor), and is formed of an annular printed circuit board. A commercially available Hall IC can be used as the magnetic detection means 47, and a plurality (for example, three) Hall ICs are mounted at predetermined intervals at positions opposing the permanent magnets of the rotor.

The speed reduction mechanism 24 decelerates an output of the motor 4 at a predetermined reduction ratio and transmits it to a spindle 31. The speed reduction mechanism 24 is configured to include: a sun gear 25 fixed to a tip of the rotating shaft 4d of the motor 4; a ring gear 28 provided on an outer circumferential side of the sun gear 25 so as to surround the sun gear 25 at a distance; and a plurality (for example, three) of planetary gears 26 that are arranged in a space between the sun gear 25 and the ring gear 28. The sun gear 25 is a spur gear that serves as an input unit for the speed reduction mechanism 24. The ring gear 28 is also called an outer gear, which forms a gear(s) on an inner circumferential surface of a ring-shaped outer cylinder portion. An outer circumferential surface of the ring gear 28 is inserted inside an inner cover 29, and the inner cover 29 is held non-rotatably with respect to the main body housing 2.

The planetary gear 26 rotates so as to be meshed with an outer circumferential side gear surface of the sun gear 25 and an inner circumferential side gear surface of the ring gear 28. The planetary gear 26 is pivotally supported by a disk-shaped portion at a rear end of the spindle 31, and the planetary gear 26 revolves around the sun gear 25 while rotating around a shaft 27 pivotally supported by the spindle 31. That is, when the rotating shaft 4d of the motor 4 rotates, the sun gear 25 rotates in synchronization with the rotation and a rotational force of the sun gear 25 is decelerated at a predetermined ratio and transmitted to the spindle 31.

The inner cover 29 is a part manufactured by integrally molding a synthetic resin, and is held by the body part 2a of the main body housing 2 so as to be sandwiched from a right-left direction. The inner cover 29 holds two bearings 21a and 22b, and is centered so that the rotating shaft 4d of the motor 4 and a rotational center of the spindle 31 are coaxial. The bearing 21a held by the inner cover 29 is for pivotally supporting the rotating shaft 4d of the motor 4, so that, for example, a ball bearing is used. The bearing 22b held by the inner cover 29 is for pivotally supporting a rear end of the spindle 31, so that, for example, a ball bearing is used.

The hammer 33 is arranged on an outer circumferential side of a shaft part of the spindle 31, and a unshown hammer cam groove 34 is formed on the inner circumferential surface. The hammer 33 is held by a cam mechanism using a steel ball 36, and the outer circumferential surface of the spindle 31 and a part of the inner circumferential surface of the hammer 33 touch each other. A hammer spring 35 is provided on a front side of a rear-side disk part of the spindle 31 and between the front side of the rear-side disk part and the hammer 33. Further, a spindle cam groove 32 is formed on the outer circumferential surface of the spindle 31. The spindle 31 is manufactured by integral molding of metal due to a relationship with its strength. A rotating body of the spindle 31 and the anvil 40 is pivotally supported at an inner wall of the hammer case 5 by the needle type bearing 22a on the front side and is pivotally supported at the hammer case 5 by the ball type bearing 22b on the rear side.

When a reaction force received from the tip tool is low, the hammer 33 rotates in conjunction with the rotation of the spindle 31. However, when the reaction force received from the tip tool becomes large, the steel ball 36 of the unshown cam mechanism moves and a relative position of the hammer 33 and the spindle 31 in a rotational direction fluctuate slightly, so that the hammer 33 moves largely to the rear side. Since the hammer 33 is always energized to the front side with respect to the spindle 31 by the hammer spring 35, the movement of the hammer 33 to the rear side is made while the hammer spring 35 is compressed. When the hammer 33 retracts, a contact length between a hitting claw of the hammer 33 and a blade part (hit claw) of the anvil 40 in a front-rear direction becomes smaller. When the contact length reaches a position of 0, engagement of the hammer 33 with the anvil 40 leads to being released.

When the engagement of the hammer 33 with the anvil 40 becomes disengaged, the hammer 33 is pushed out on the front side by a compressive force of the hammer spring 35 and leads to being engaged (or colliding) with the next hit claw of the anvil 40 when viewed in the rotational direction. At this time, the hammer 33 is rapidly accelerated in the rotational direction and on the front side by actions of elastic energy accumulated in the hammer spring 35 and the cam mechanism in addition to the rotational force of the spindle 31, moves forward by an energizing force of the hammer spring 35, and begins to rotate integrally by the striking claw of the hammer 33 being reengaged with the blade part of the anvil 40. At this time, since a strong rotational striking force is applied to the anvil 40, the rotational striking force is transmitted to the screw via a unshown tip tool attached in the attaching hole 42 of the anvil 40. Subsequently, the same operation is repeated, and the disengagement and engagement operations are repeated (striking operation) until the tightening of a tightening target is completed.

The tip tool holding unit 70 can apply to a known configuration, that is, is configured to include: an attaching hole 42 that has a hexagonal cross-sectional shape extending axially rearward from a front end portion of the anvil 40; steel balls 74 formed at two locations in a circumferential direction; and a sleeve 71 provided on an outer circumference side. A coil spring 72 that energizes the sleeve 71 to the rear side is attached inside the sleeve 71. The coil spring 72 is held by a washer 73 held by a C-shaped ring so as not to come off to the front side.

Figure 2:
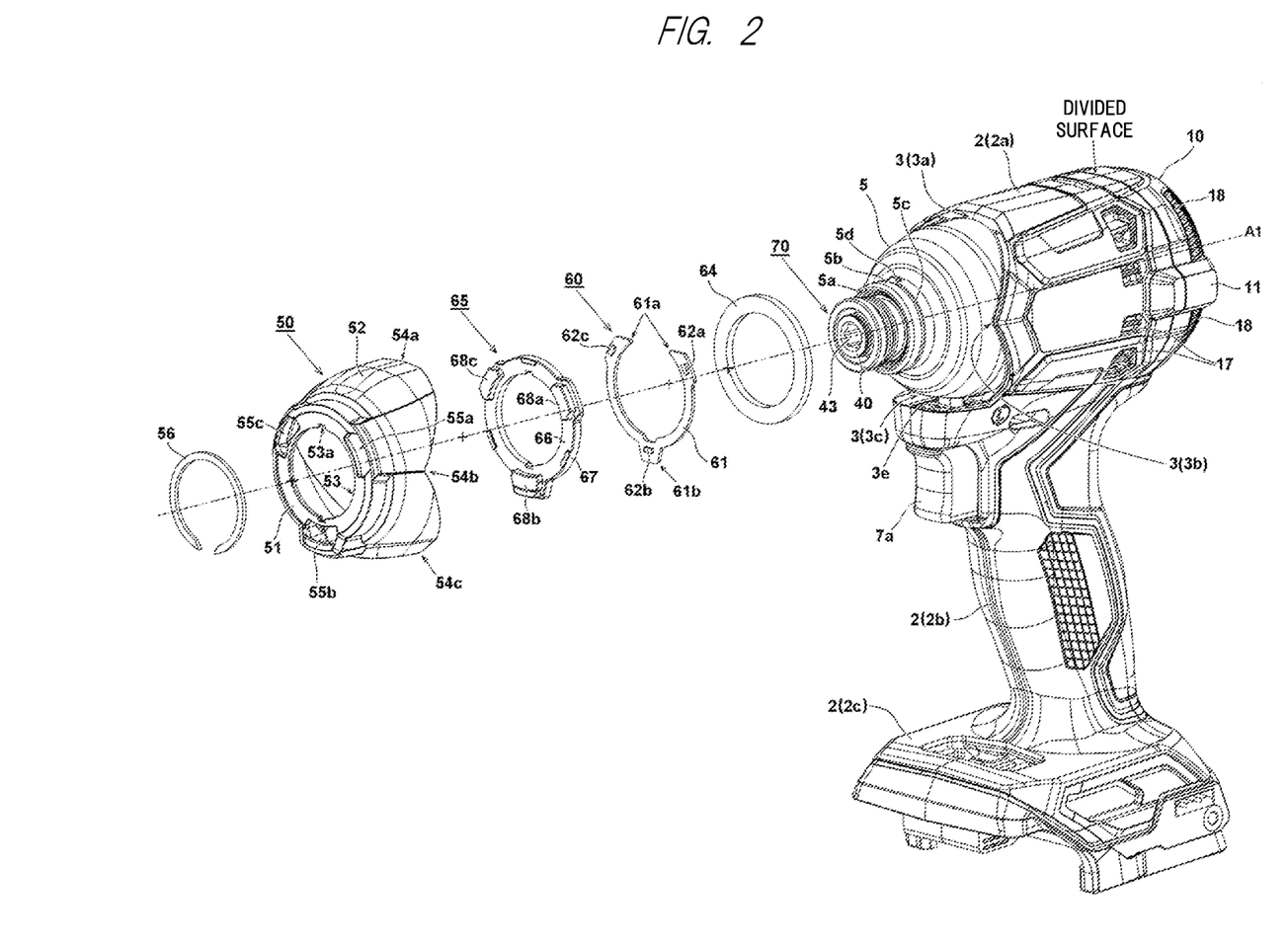
FIG. 2 is a developed perspective view of an enclosure (2, 5, 20) and a cover 50 in the impact device 1 of FIG. 1.

FIG. 2 is a developed perspective view of an enclosure and a cover 50 of the impact device 1 of FIG. 1. An enclosure of the impact device 1 is composed of a synthetic resin part (main body housing 2, rear cover 10) and a metal part (hammer case 5). The main body housing 2 is configured to be capable of being divided into two rightward and leftward in a vertical plane including the rotational axis A1. The body part 2a of the main body housing 2 has such a substantially cylindrical shape that the rotational axis A1 becomes a central axis thereof, has openings on the front side and the rear side of a cylindrical portion, and the metal hammer case 5 is connected to the front-side opening portion 3. A rear cover 10 manufactured by integral molding of a synthetic resin is attached to the rear-side opening of the body part 2a. The rear cover 10 uses screw bosses 11 formed on both left and right sides (right-side screw boss 11 cannot be seen in FIG. 2), and is fixed to the body part 2a by two unshown screws arranged in a direction parallel to the rotational axis A1. A plurality of air intake ports (third vents) 17 dispersed in a circumferential direction are formed in the vicinity of a divided surface (surface perpendicular to rotational axis A1) of the body part 2a with the rear cover 10. Further, air outlet ports (fourth vents) 18 formed in a slit shape are formed on right and left side surfaces of the cylindrical portion of the rear cover 10.

The hammer case 5 has a bell shape having an opening 5f (see FIG. 4 described later for reference numerals) on the rear side, and is fixed so that the vicinity of a rear end thereof is sandwiched by the main body housing 2. A front side of the body part 2a becomes an opening 3, but a line connecting an outer edge of the opening 3 is not a circular opening surface orthogonal to the rotational axis A1. Both the left and right sides of the opening 3 are formed so that a front extending portion 3b whose contour is formed by an edge of a side wall of a triangle toward the front side, and constitute features on design. Since the front extending portions 3b are located in the right and left directions of the hammer case 5, the hammer case 5 can be held more stably. An upper side portion 3a of the opening 3 extends rightward and leftward, and an abutment surface that abuts on a rear edge upper portion 54a of the cover 50 is formed at the upper side portion. An abutment surface of the upper side portion 3a has such a slope as to recede as it goes radially outward with respect to the rotational axis A1, so that a gap between the rear edge upper portion 54a and the upper side portion 3a forms a part (upper side part) of a second vent. A lower side portion 3c of the opening 3 becomes a gap portion for inserting a rear edge lower portion 54c of the cover 50 between the lower side portion 3c and a holding portion of the trigger lever 7a of the main body housing 2.

A through hole 5a is formed on the front side of the hammer case 5. A part of the through hole 5a is formed into a short cylindrical shape (cylindrical portion 5b), and a circumferential groove 5c continuous in the circumferential direction is formed on an outer peripheral surface thereof. The circumferential groove 5c is a groove for attaching a retaining ring 56. A convex portion 5d for positioning a rotational direction using the rotational axis A1 of the cover 50 as an axial line is formed on the rear side of the circumferential groove 5c. The anvil 40 penetrates on the front side from the through hole 5a of the hammer case 5, and the tip tool holding unit is fixed to a tip portion of the anvil 40.

The cover 50 is a molded product of a synthetic resin having higher elasticity than the main body housing 2, and covers an outer portion of the hammer case 5 located on the front side of the main body housing 2. On both the left and right sides of the cover 50, such rear edge V-shaped portions 54b as to recede rearward in a V-shape are formed, and oppose the front extending portions 3b formed in the main body housing 2. By providing the cover 50 in this way, a metal portion having high thermal conductivity (outer circumferential side exposed surface on the outer circumferential side of the hammer case 5) can be covered, so that the present embodiment is configured for the operator to be unable to directly touch the hammer case 5 located on an outer circumferential side of a heat generating portion. A shape of the cover 50 is set to a shape corresponding to the outer circumferential side exposed surface of the hammer case 5, and an opening 53 is formed on the front side. The opening 53 is a hole for penetrating the cylindrical portion 5b of the hammer case 5, and two rotation-stop concave portions 53a are formed above and below the opening 53 so as to be prevented from rotating in the rotational direction using the rotational axis A1 as the axial line. The concave portion 53a engages with a convex portion 5d of the hammer case 5. An annular portion 51 formed in a plane is formed on an outer circumferential side of the opening 53 of the cover 50, and three through holes 55a to 55c are formed in a circumferential direction of the annular portion 51. A part of the annular portion 51 is located on an inner circumferential side of the through holes 55a to 55c, and the annular portion abuts on a retaining ring 56 to be provided on a front side thereof.

A lighting device 60 is configured by an inverted horseshoe-shaped (U-shaped) lighting board 61 and LEDs (light emitting diodes) 62a to 62c soldered onto the lighting board 61. For the LEDs 62a to 62c, it is preferable to use a chip LED surface emitting type for surface mounting. The lighting board 61 is called a printed circuit board, and is obtained by forming conductor wirings on a board made of an insulator. Although not shown in FIG. 2, a wiring 63 (see FIG. 1) extending from a control circuit board 48 is connected to a rear side of the lighting board 61, and electric power is supplied to the LEDs (light emitting diodes) 62a to 62c from the control circuit board 48 via the wiring 63. An upper side of the lighting board 61 becomes an opening end 61a, and a lower side thereof has a protruding portion 61b formed for positioning the lighting board at the concave portion 3e formed in the inner wall portion of the main body housing 2.

The board holder 65 is a transparent or translucent synthetic resin member. The board holder 65 is configured based on an annular surface 66 and a cylindrical surface 67 connected to an outer circumferential side thereof. The annular surface 66 abuts on a front side surface of the lighting board 61 except for the vicinity of the LEDs 62a to 62c, and the cylindrical surface 67 abuts on an outer edge of the board holder 65, thereby accommodating the lighting board 61 inside it. Irradiation windows 68a to 68c formed so as to project forward are formed on portions of the board holder 65 opposing the LEDs 62a to 62c. The irradiation windows 68a to 68c are located so as to be separated from the LEDs 62a to 62c by a predetermined distance, and causes light from the LEDs 62a to 62c to pass in a predetermined direction (here, in a direction substantially parallel to the rotational axis A1). Here, the irradiation windows 68a to 68c are formed as simple transparent plate-shaped windows, but they may each be formed in a lens shape so that transmitted light is directed in a predetermined direction or is diffused.

To assemble the impact device from a developed state of FIG. 2, first, the lighting board 61 is fitted into the board holder 65, and they are fitted inside the cover 50 for assembly. Next, the convex irradiation windows 68a to 68c of the board holder 65 are fitted into the through holes 55a to 55c of the cover 50, and they are positioned inside the cover 50. After an assembly of the cover 50, the board holder 65, and the lighting board 61 is completed in this way, the assembly is moved on a rear side along the rotational axis A1 while interposing the elastic body 64 behind them, and the cover 50 is positioned so as to be caused to adhere tightly to the hammer case 5. Under such a state, the C-shaped metal retaining ring 56 is attached into a circumferential direction groove 5c of the hammer case 5, and the cover 50 is held so as not to slip from the front side of the rotational axis A1. At this time, by making the elastic body 64 slightly compressed, a slight energizing force has acted on the front side with respect to the cover 50. The elastic body 64 as an energizing member may use an annular rubber, a foamed member, or the like. Incidentally, a shape of the elastic body 64 does not have to be an annular shape, and may be a shape stepped in the circumferential direction, a C-shape, or the like. Further, a known spring means may be used as the elastic body 64. Furthermore, the elastic body 64 may be composed of a plurality of parts. In this way, the cover 50 is supported by the hammer case 5 in a state of being slightly moveably in a rotational axis A1 direction of the drive unit (motor 4).

Figure 3:
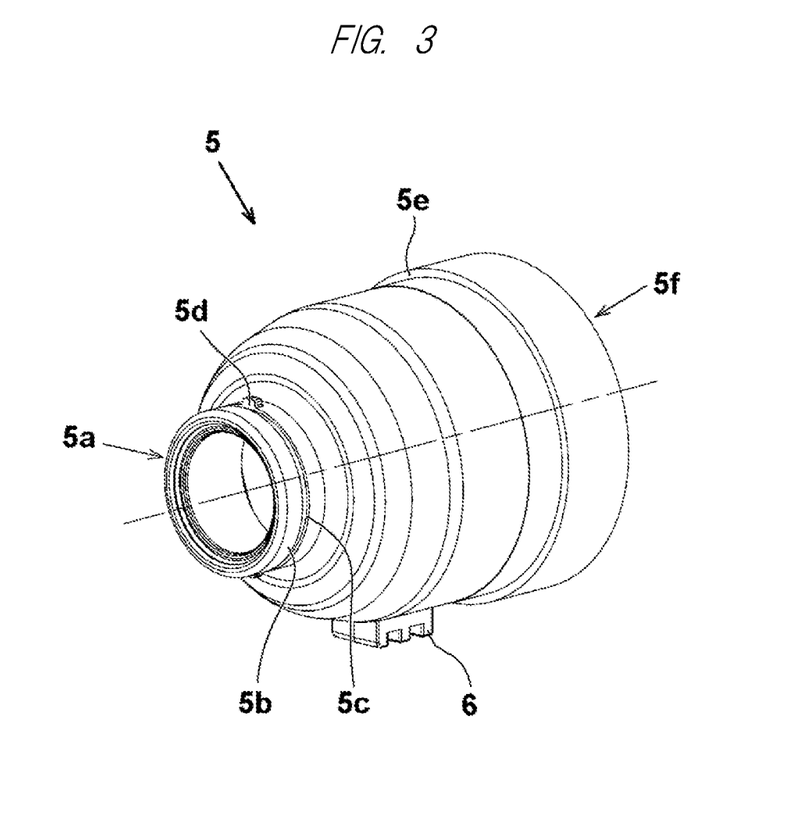
FIG. 3 is a perspective view of a hammer case 5 alone of FIG. 2.

FIG. 3 is a perspective view of a hammer case 5 alone of FIG. 2. The hammer case 5 is a member that constitutes a part of the enclosure of the impact device 1 connected to the front-side opening 3 of the body part 2a of the main body housing 2. The hammer case 5 in the impact device 1 accommodates a speed reduction mechanism 24 (see FIG. 1) and a striking mechanism 30 (see FIG. 1), holds a bearing 22a that pivotally supports an anvil 40 as an output shaft, and accommodates a bearing 22b for pivotally supporting a spindle 31, so that it is manufactured with sufficient rigidity by integral molding. The cylindrical portion 5b serves as a base portion for sliding the cover 50, and the circumferential groove 5c and the retaining ring 56 serve as a fixing tool for fixing the cover 50. An internal space between the speed reduction mechanism 24 and the striking mechanism 30 is filled with grease. Although the hammer case 5 of the present embodiment is made of metal with an aluminum alloy, it may be made of other materials. The hammer case 5 has a bell shape, its front side forming a cylindrical through hole 5a that penetrates through the anvil 40, and its rear side being a circular opening 5f connected to the front-side opening 3 of the main body housing 2. The vicinity of the opening 5f of the hammer case 5 is sandwiched from right and left by the main body housing 2. In order to facilitate clamping of the hammer case 5, a stepped portion 5e is formed in the vicinity of the opening 5f and, further, a protruding portion 6 for preventing relative movement with the main body housing 2 is formed. Ribs extending from rightward and leftward are formed on an inner wall portion of the main body housing 2, and the protruding portion 6 is configured to be suppressed from right and left by the ribs.

Figure 4:
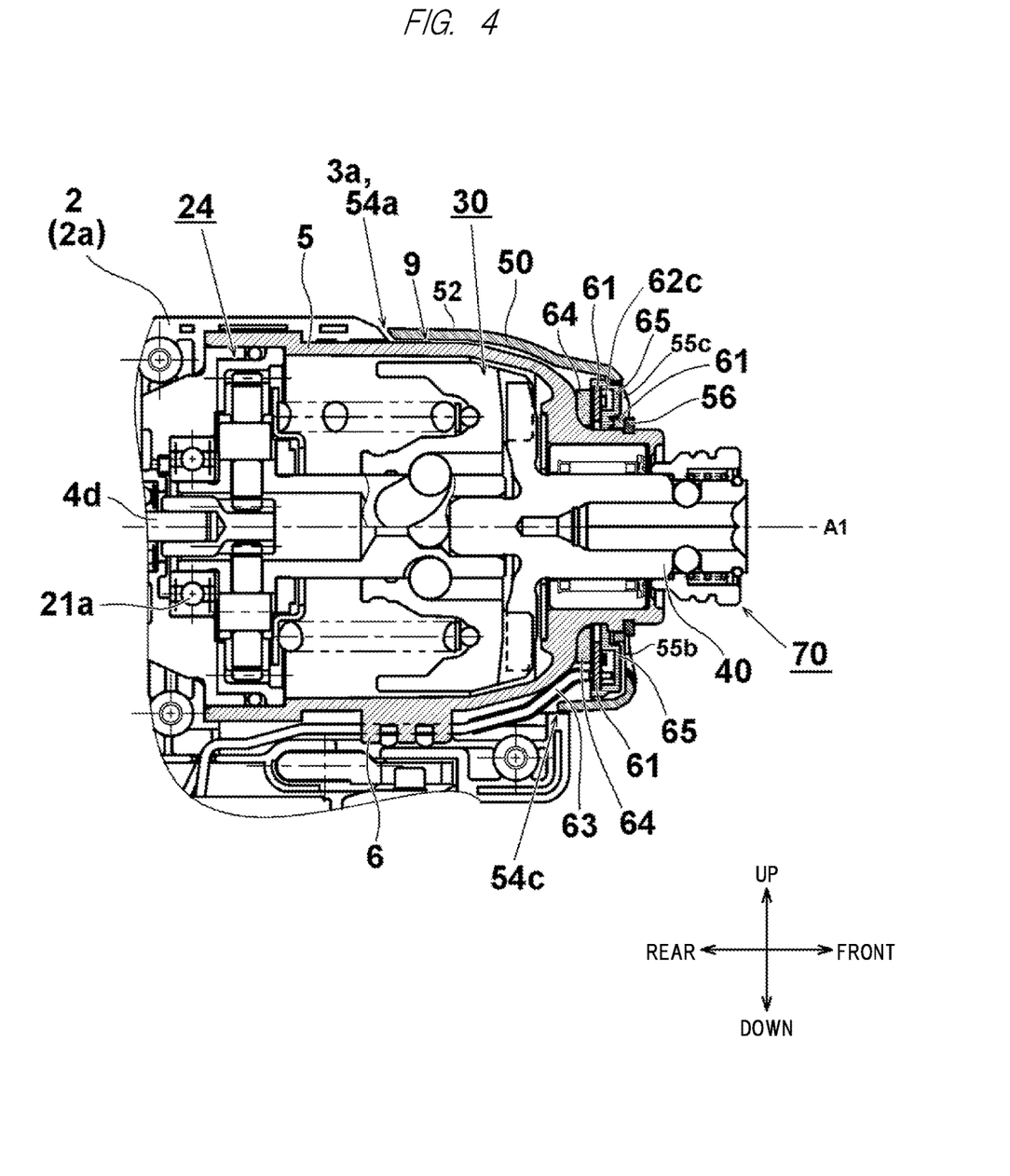
FIG. 4 is a partial sectional view of a neighborhood of a striking mechanism 30 of FIG. 1.

FIG. 4 is a partial sectional view of the vicinity of the striking mechanism 30 of FIG. 1. The striking mechanism 30 is accommodated inside the hammer case 5. Since the main body housing 2 is made of a synthetic resin, thermal conductivity of the metal hammer case 5 is higher and heat generated by the motor 4 is easily transmitted to the hammer case 5. Therefore, the synthetic resin cover 50 is attached so that the operator cannot directly touch the outer surface of the hammer case 5. Only if the operator does not directly touch the hammer case 5, the cover 50 may be caused to adhere tightly outside the hammer case 5. However, the present embodiment has been configured to have a slight gap 9 between the cover 50 and the hammer case 5. As a result, formed has been an airflow passage in which a passage portion is formed (second vent) between the through holes 55a to 55c on the front side of the cover 50 (first vents: 55c, 55b are shown so as to be visible in the figure) and the rear edge 54 (54a to 54c: 54b is invisible in the figure) of the cover 50. As shown in a developed perspective view of FIG. 2, the cover 50 is attached so as to cover an outside of the hammer case 5 from the front side in a rotational axis A1 direction, and is fixed by the retaining ring 56. At this time, instead of causing an inner portion of the cylindrical wall 52 of the cover 50 to adhere tightly to the hammer case 5, the opening 53 (for example, the concave portion 53a) of the cover 50 has mainly contacted with the cylindrical portion 5b and the convex portion 5d of the hammer case 5 (see FIG. 3). That is, the relative movement with respect to the cover 50 and the hammer case 5 is not completely restrained. As a result, the cover 50 slightly moves in a front-rear direction during an operation of the impact device 1 and in other directions due to recoil or vibration. If a material of the cover 50 is configured to have flexibility enough to allow such movement, a size of the gap 9 will greatly fluctuate during the operation of the impact device 1. As a result, a volume in the airflow passage formed by the gap 9 fluctuates, so that air in the airflow passage is sucked in or exhausted from the outside.

Figure 5:
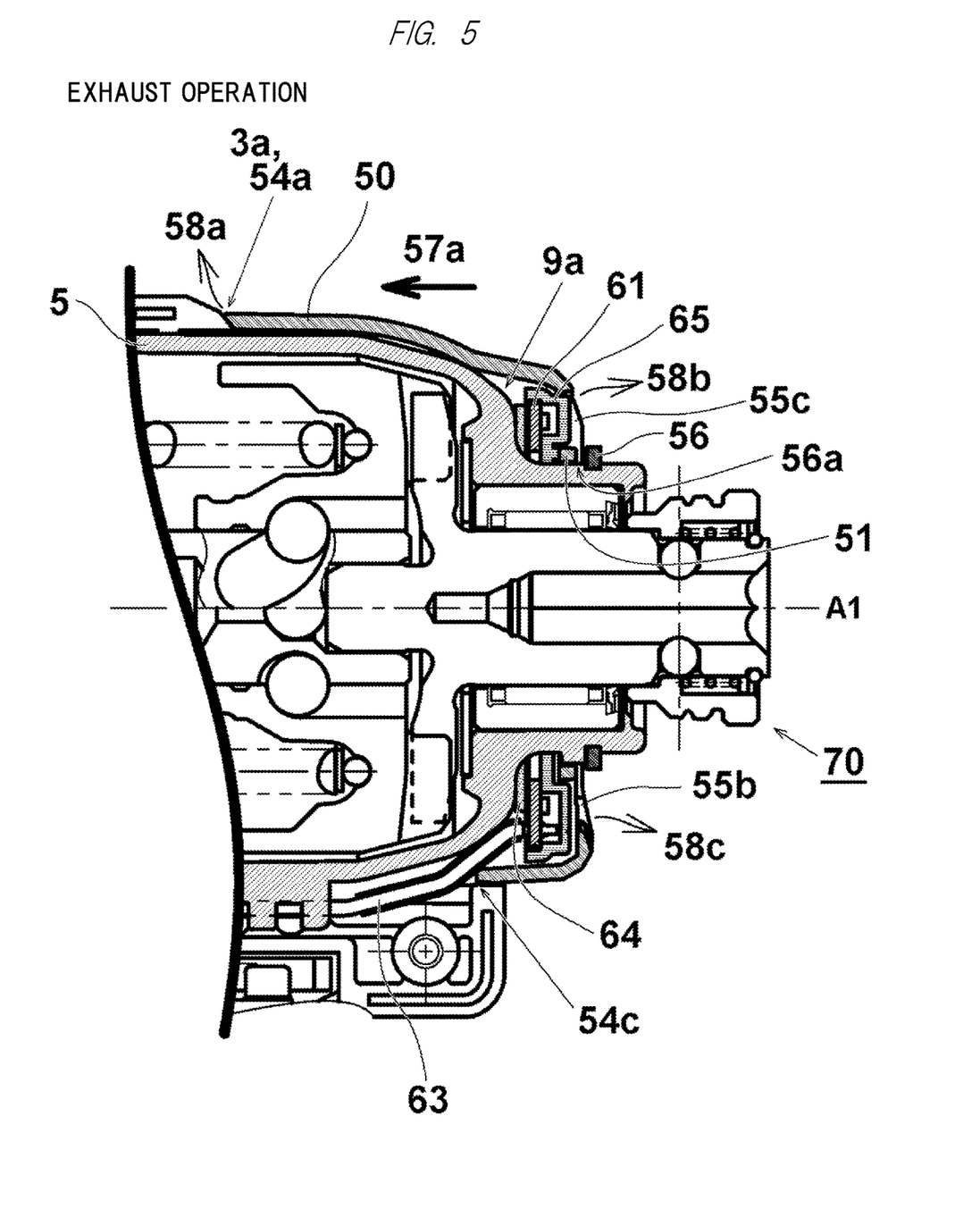
FIG. 5 is a partially enlarged view of a neighborhood of a hammer case 5 and the cover 50 of FIG. 3 during an exhaust operation.

FIG. 5 is a partially enlarged view of a neighborhood of the hammer case 5 and the cover 50 of FIG. 3 during an exhaust operation. During the operation of the impact device 1, the cover 50 is in a state of being moved on a rear side as shown by an arrow 57a. A retreat of the cover 50 causes the lighting board 61 and the board holder 65 to retreat in the same manner. A retreat of the lighting board 61 is made while the elastic body 64 is compressed. When the cover 50 is retracted, the annular portion 51 is separated from a rear surface of the retaining ring 56 and becomes such a state as to generate the gap 56a and the gap 9a is narrowed above such a state, so that the volume in the airflow passage is reduced and air existing inside is exhausted to the outside as shown by the arrows 58a to 58c. Incidentally, in the sectional view of FIG. 5, an exhaust state at a point indicated by the arrow 58a is typically shown, but the same air exhaust is performed at the opening 3 of the hammer case 5 in the circumferential direction and at the entire portion of the rear edge 54 of the cover 50.

The arrow 58a is a flow of air discharged outside from the gap portion between the upper side portion 3a of the opening 3 of the body part 2a and the rear edge upper portion 54a of the cover 50. Further, the arrows 58b, 58c are flows of air discharged outside from respective gaps between the through holes 55a to 55c of the cover 50 and the board holder 65. In the configuration of the present embodiment, the lighting board 61 and the board holder 65 also move altogether with the movement of the cover 50 rearward in the rotational axis A1 direction, so that the lighting board 61 and the board holder 65 move like blades for discharging air.

Figure 6:
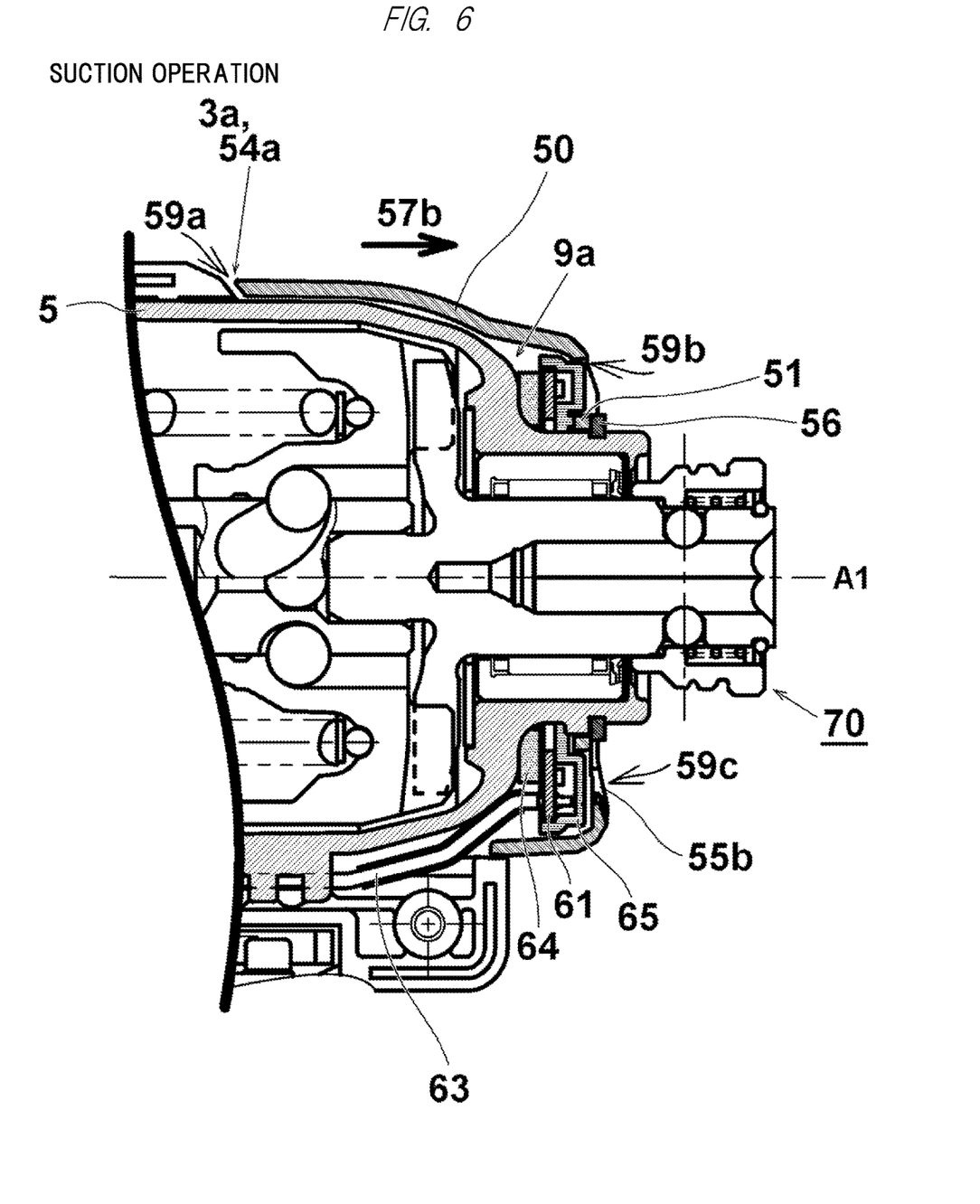
FIG. 6 is a partially enlarged view a neighborhood of the hammer case 5 and the cover 50 of FIG. 3 during a suction operation.

FIG. 6 is a partially enlarged view of a neighborhood of the hammer case 5 and the cover 50 of FIG. 3 during an air intake operation. After the cover 50 is retracted as shown in FIG. 5, the cover 50 moves forward as shown by the arrow 57b due to a restoring force of the elastic body 64 and returns to an original position (position shown in FIG. 4). As the cover 50 advances, the lighting board 61 and the board holder 65 also advance in the same manner. An advanced position of the cover 50 is limited to a position where the annular portion 51 contacts the rear surface of the retaining ring 56. Since the volume in the airflow passage reduced due to the advancement of the cover 50 increases again, air is sucked from the outside into the inside as shown by the arrows 59a to 59c. That is, the same air suction as that of the arrow 59a is performed at the opening 3 of the hammer case 5 and the entire portion of the rear edge 54 of the cover 50. The arrows 59b, 59c are flows of air sucked from the respective gaps between the through holes 55a to 55c of the cover 50 and the board holder 65.

As described above, since the cover 50 swings back and forth with respect to the hammer case 5 during the operation of the impact device 1, an airflow is generated in the gap 9 between the hammer case 5 and the cover 50 by repeating the states of FIGS. 5 and 6 and heat can be taken from an outer surface of the hammer case 5, so that a cooling effect of the hammer case 5 can be enhanced.

Figure 7:
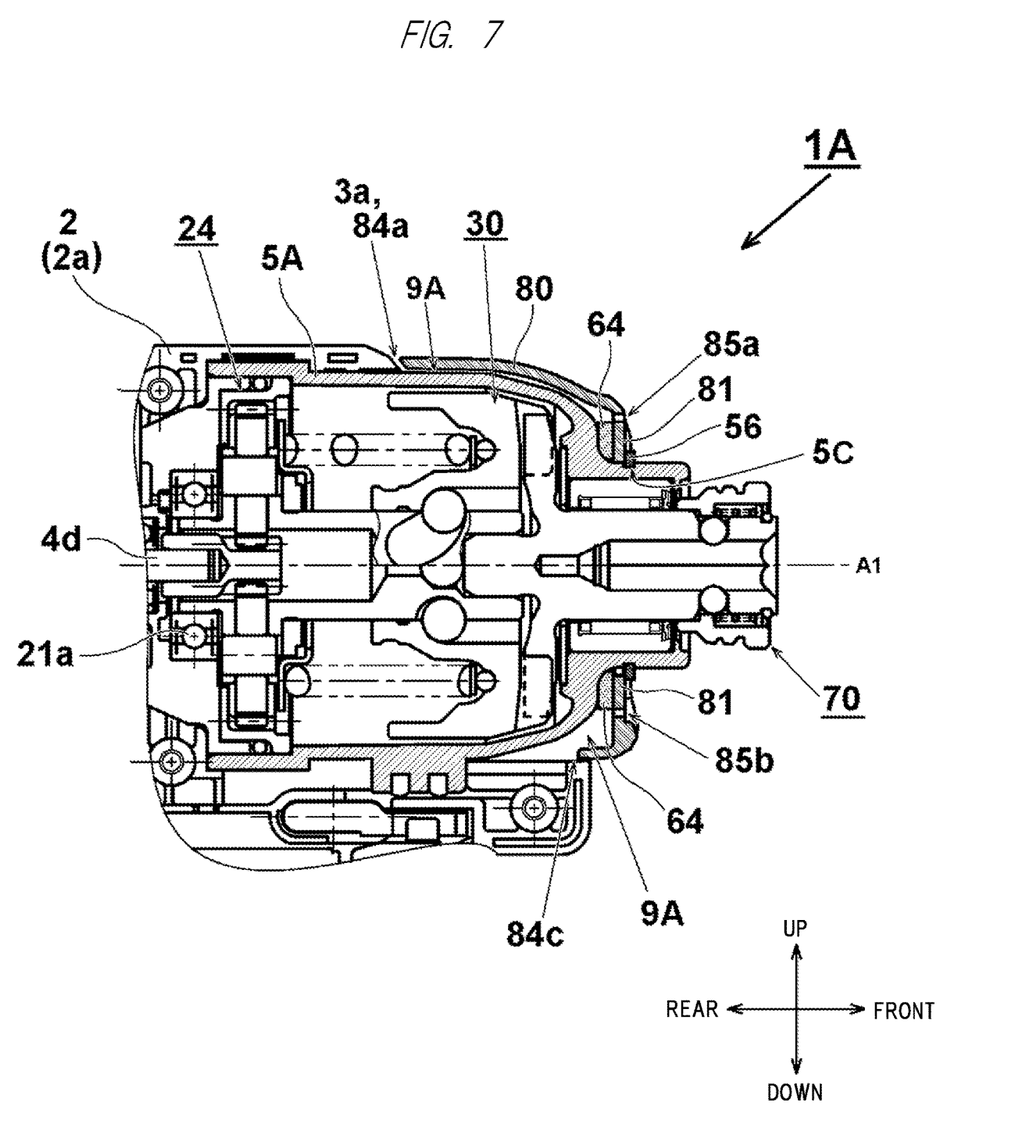
FIG. 7 is a partial sectional view of a neighborhood of a striking mechanism 30 according to a modification example of the present embodiment.

FIG. 7 is a partial sectional view of a neighborhood of a striking mechanism 30 according to a modification example of the present embodiment. In the embodiment shown in FIGS. 1 to 6, the lighting device (lighting board 61, board holder 65, etc.) is provided between the cover 50 and the hammer case 5. However, it is not essential to provide the lighting device to obtain the effect of the present invention. FIG. 7 is a partial sectional view of an neighborhood of a striking mechanism 30 of an impact device 1A without providing the lighting device. A shape of a hammer case 5A is the same as that of the hammer case 5 shown in FIG. 3 except that a position of a circumferential-directional groove 5C in a rotational axis A1 direction is different.

A shape of a cover 80 is almost the same as that of the cover 50 of the first embodiment, but a space for accommodating the lighting device (lighting board 61, board holder 65, etc.) needs not to be provided inside, so that the front side position (position of the annular portion 81) is formed slightly rearward. Vent holes 85a, 85b which the rotational axis A1 penetrates are formed in the annular portion 81 of the cover 80. That is, the vent holes 85a, 85b allow outside air to flow in and out between the outer surface of the housing portion (hammer case 5) and the cover 50. The number of vent holes 85a, 85b to be provided is two or more in the circumferential direction, and an inflow and an outflow of the air to the airflow passage by the gap 89 are possible. The elastic body 64 is interposed on the rear side of the annular portion 81 of the cover 80, thereby being held on the front side by the retaining ring 56 so as not to slip from the hammer case 5A. As described above, when the impact device 1 is operated, the cover 80 swings back and forth and radially, etc. with respect to the hammer case 5A and the airflow in the airflow passage due to the gap 89 is generated, so that the hammer case 5A can be cooled effectively.

Second Embodiment

Figure 8:
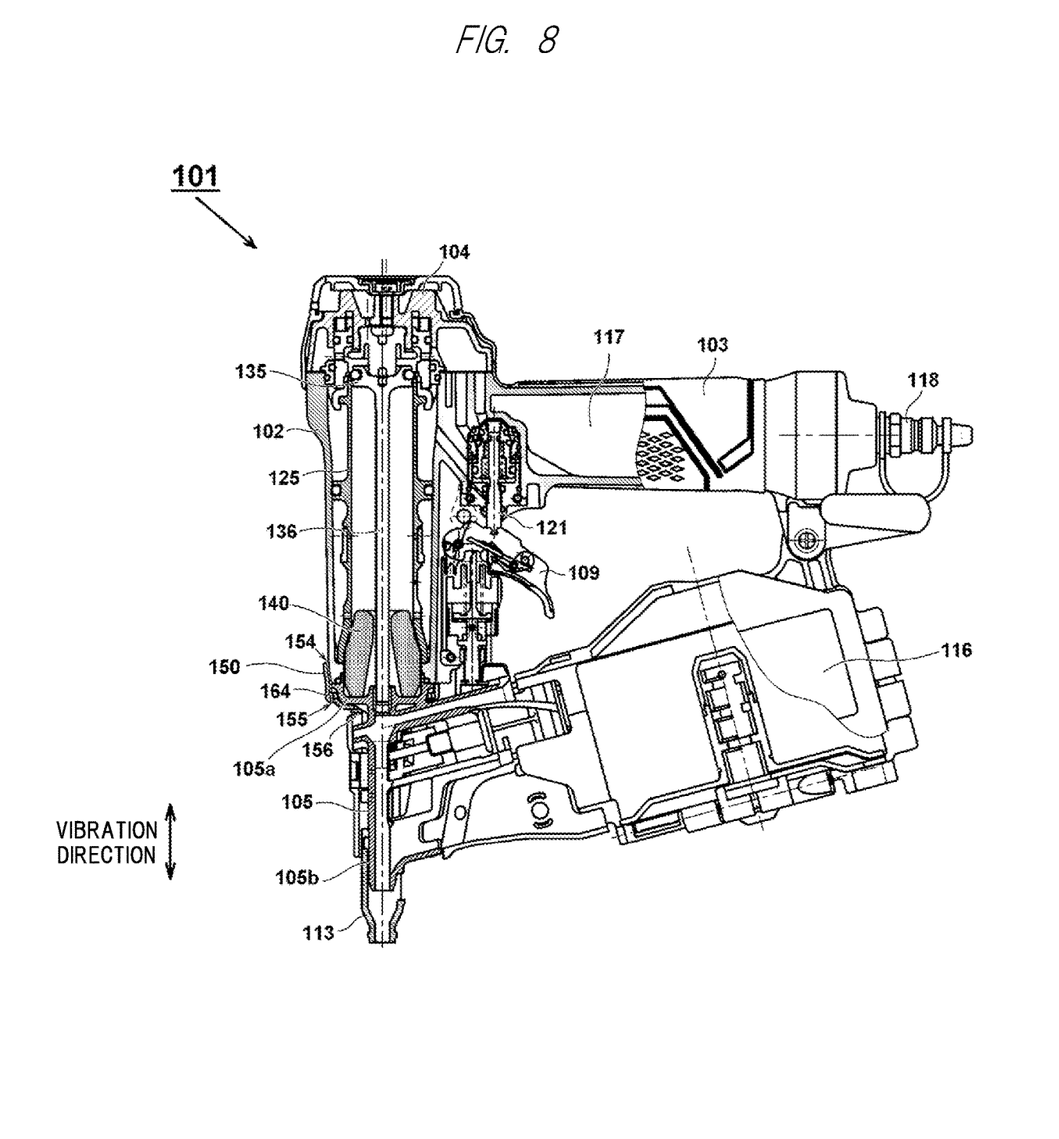
FIG. 8 is a vertical sectional view showing an internal structure of a nail driver 101 according to a second embodiment of the present invention.

Next, a second embodiment of the present invention will be described with reference to FIG. 8. FIG. 8 is a vertical sectional view showing an internal structure of a nail driver 101 according to a second embodiment of the present invention. The present invention is configured so that a slightly movable flexible cover 150 is provided outside a metal housing portion (cylinder case 102, injection path case 105) of a working device so as to separate a slight gap and that an airflow between the metal housing and the cover 150 during an operation of the working device is generated. The principle of this configuration is the same as that of the first embodiment, and the present invention can similarly be applied not only to the impact device 1 as described in the first embodiment but also to other working devices whose power sources are other than the motor.

An outer-shell shape of the nail driver 101 is determined by a main body part that includes: a cylinder case 102 having a cylindrical shape; a handle 103 protruding in a direction substantially orthogonal from an axial direction of the cylindrical shape of the cylinder case 102; a head cover 104 for closing a lid of an upper side opening of the cylinder case 102; and a projection path case 105 fixed to a lower side opening of the cylinder case 102. A trigger lever 109 for injecting a fastener is provided on a lower side near a base of the handle 103, and an accumulator 117 is formed inside the handle 103. The accumulator 117 is provided over from the inside of the handle 103 to the inside of the cylinder case 102, and is a space for accumulating compressed air supplied by a unshown air hose attached to and detached from a plug 118. A trigger valve mechanism 121 is provided in the vicinity of the cylinder case 102 of the handle 103. The trigger valve mechanism 121 controls an on-off valve of an air passage passing through the trigger valve mechanism 121 from the accumulator 117. The injection path case 105 is composed of a nose portion 105b having a through hole in a center as well as a closing portion 105a that closes the lower side of the cylinder case 102.

A push lever 113 having an injection passage formed therein is provided below the nose portion 105b of the injection path case 105. A magazine 116, which is a means for supplying a fastener, is provided behind a guide passage of the injection path case 105. The magazine 116 accommodates a plurality of nails (not shown) as fasteners, and sequentially feeds the nails to be hit into the injection path.

A cylinder 125 is provided over in the cylinder case 102 and in the head cover 104. The piston 135 is accommodated inside the cylinder 125, and a driver blade 136 is connected to a lower side of the piston 135 so as to extend.

When the operator pulls the trigger lever 109, the accumulator 117 and a upper side space of the piston 135 communicate with each other, so that compressed air flows into the upper side space of the piston 135 and thereby the piston 135 moves toward a bottom dead center side at once.

When the piston 135 moves to a bottom dead center, it collides with a piston bumper 140. The piston bumper 140 is formed by molding an elastic body such as a synthetic rubber into a substantially cylindrical shape, and has a shaft hole at a center. Since the piston 135 stops downward movement of the piston 135, continuous use of the nail driver 101 causes a large amount of heat generation.

In the second embodiment, a synthetic resin cover 150 is provided so as to cover an outer circumferential surface of a portion, which closes the lower side opening of the cylinder case 102 (closed portion 105a), on the metal injection path case 105. The cover 150 is attached so as to cover the closing portion 105a of the injection path case 105 from below with the elastic body 164 interposed therebetween, and is fixed by the retaining ring 156. An upper end 154 of the cover 150 serves as a vent (second vent), and a plurality of vents 155 (first vent) are further formed on a lower side thereof.

In the second embodiment, a drive unit of the working device (from the trigger valve mechanism 121, which is opened by the trigger operation, to the piston 135) uses compressed air as an energy source, and an energy supply unit (flow path by the plug 118 and the accumulator 117) is configured as a compressed air supply unit that supplies compressed air. However, even in the working device (nail driving device 101) using such compressed air, providing the cover 150 outside the housing makes it possible to effectively cool the closed portion 105a of the injection path case 105 and the vicinity of the lower end of the cylinder case 102.

Although the present invention has been described above based on two embodiments, the present invention is not limited to the above-mentioned embodiments and can be variously modified within a range not departing from the scope of the present invention. For example, an internal combustion engine using fuel as an energy source may be configured as a drive source for the working device. In that case, an energy supply unit is configured as a fuel supply unit that supplies fuel to the internal combustion engine. As an example, a gas type nail driver using gas fuel as an energy supply source of the nail driver 101, which is the second embodiment, can be considered.

EXPLANATION OF REFERENCE NUMERALS 1, 1A . . . Impact device; 2 . . . Main body housing; 2a . . . Body part; 2b . . . Handle part; 2c . . . Battery attaching part; 3 . . . Opening; 3a . . . (Opening) upper side part; 3b . . . (opening) front extending portion; 3c . . . (Opening) lower side part; 3e . . . Concave portion; 3f . . . Opening; 4 . . . Motor; 4a . . . Rotor; 4b . . . Stator core; 4c . . . Coil; 4d . . . Rotating shaft; 5, 5A . . . Hammer case; 5a . . . Through hole; 5b . . . Cylindrical portion; 5c, 5C . . . Circumferential groove; 5d . . . Convex portion; 5e . . . Step portion; 5f . . . Opening; 6 . . . Protruding portion; 7 . . . Trigger switch; 7a . . . Trigger lever; 8 . . . Forward/reverse switching lever; 9, 9a . . . Gap; 10 . . . Rear cover; 11 . . . Screw boss; 15 . . . Cooling fan; 17 . . . Air intake port (third vent); 18 . . . Air outlet port (fourth vent); 19a to 19g . . . Screw boss; 21a, 21b . . . Bearing; 22a, 22b . . . Bearing; 24 . . . Speed reduction mechanism; 25 . . . Sun gear; 26 . . . Planetary gear; 27 . . . Shaft; 28 . . . Ring gear; 29 . . . Inner cover; 30 . . . Striking mechanism; 31 . . . Spindle; 32 . . . Spindle cam groove; 33 . . . Hammer; 34 . . . Hammer cam groove; 35 . . . Hammer spring; 36 . . . Steel ball; 40 . . . Anvil; 42 . . . Attaching hole; 45 . . . Drive circuit board; 46 . . . Semiconductor switching element; 47 . . . Magnetic detection means; 48 . . . Control circuit board; 49 . . . Switch holder; 50 . . . Cover; 51 . . . Annular portion; 52 . . . Cylindrical wall; 53 . . . Opening, 53a . . . Concave portion; 54 . . . Rear edge; 54a . . . Rear edge upper portion; 54b . . . Rear edge V-shaped portion; 54c . . . Rear edge lower portion; 55a to 55c . . . Through hole; 56 . . . Retaining ring; 56a . . . Gap (on rear surface side of retaining ring); 58a to 58c . . . Exhaust direction; 59a to 59c . . . Suction direction; 60 . . . Lighting device; 61 . . . Lighting board; 61a . . . Opening end; 61b . . . Protruding portion; 62a to 62c . . . LED; 63 . . . Wiring; 64 . . . Elastic body; 65 . . . Board holder; 66 . . . Annular surface; 67 . . . Cylindrical surface; 68a to 68c . . . Irradiation window; 70 . . . Tip tool holding unit; 71 . . . Sleeve; 72 . . . Coil spring; 73 . . . Washer; 74 . . . Steel ball; 80 . . . Cover; 81 . . . Annular portion: 85a, 85b . . . Vent hole; 89 . . . Gap; 90 . . . Battery; 91 . . . Release button; 101 . . . Nail driver; 102 . . . Cylinder case; 103 . . . Handle; 104 . . . Head cover; 105 . . . Injection path case; 105a . . . Closing portion; 105b . . . Nose portion; 109 . . . Trigger lever; 113 . . . Push lever; 116 . . . Magazine; 117 . . . Accumulator; 118 . . . Plug; 121 . . . Trigger valve mechanism; 125 . . . Cylinder; 135 . . . Piston; 136 . . . Driver blade; 140 . . . Piston bumper; 150 . . . Cover; 154 . . . Upper end; 155 . . . Vent; 156 . . . Retaining ring; 164 . . . Elastic body; and A1 . . . (Motor) rotational axis.

The invention claimed is:

1. A working device comprising:
a drive unit that generates a driving force;
an energy supply unit that supplies energy to the drive unit;
a power transmission unit that is driven by the drive unit;
an enclosure portion accommodating the drive unit, the energy supply unit, and the power transmission unit; and
a cover portion that covers at least a part of an outer surface of the enclosure portion,
wherein the working device has an airflow passage formed between an inner surface of the cover portion and the outer surface of the enclosure portion,
wherein the airflow passage includes at least one vent communicating the airflow passage with outside air, and
wherein the cover portion is supported to be movable relative to the enclosure portion such that vibration generated during operation of the working device causes the cover portion to move, resulting in fluctuation of a volume of the airflow passage and allowing outside air to flow into and out of the airflow passage through the at least one vent.

2. The working device according to claim 1, wherein the at least one vent comprises first and second vents that open outside the working device; and
wherein the passage portion connects the first and second vents.

3. The working device according to claim 2, wherein the at least one vent is configured by a gap formed between the outer surface of the enclosure portion and the cover portion.

4. The working device according to claim 2, wherein the at least one vent is configured by a through hole penetrating inner and outer surfaces of the cover portion.

5. The working device according to claim 1, wherein the cover portion and the airflow passage are provided at least one of a position corresponding to the power transmission unit, a position corresponding to the energy supply unit, or a position corresponding to the drive unit.

6. The working device according to claim 1,
wherein the drive unit is configured by an electric motor using electric power as an energy source, and wherein the energy supply unit is configured as a power supplying unit for supplying electric power to the electric motor.

7. The working device according to claim 6, wherein the power supplying unit is supplied with power from a detachable battery pack.

8. The working device according to claim 1,
wherein the drive unit is configured by using compressed air as an energy source, and
wherein the energy supply unit is configured as a compressed air supply unit for supplying the compressed air.

9. The working device according to claim 1,
wherein the drive unit is configured by an internal combustion engine using fuel as an energy source, and
wherein the energy supply unit is configured as a fuel supply unit for supplying the fuel to the internal combustion engine.

10. The working device according to claim 1, wherein an elastic member is provided between the cover portion and the enclosure portion, which biases the cover portion away from the enclosure portion in an axial direction of the drive unit.

11. A working device comprising:
a drive unit that generates a driving force;
an energy supply unit that supplies energy to the drive unit;
a power transmission unit that is driven by the drive unit;
an enclosure portion accommodating the drive unit, the energy supply unit, and the power transmission unit; and
a cover portion that covers at least a part of an outer surface of the enclosure portion,
wherein the enclosure portion has a housing accommodating the drive unit, and a case connected to a front of the housing and accommodating the power transmission unit,
wherein the cover portion is configured to cover the case,
wherein the working device has an airflow passage, the airflow passage comprising:
  a first vent and a second vent that communicate with an exterior of the enclosure portion and are provided between the cover portion and the enclosure portion or in at least one of the cover portion and the enclosure portion; and
  a passage portion that connects the first vent and the second vent and is formed between the outer surface of the enclosure portion and an inner surface of the cover portion, and from the first vent passes between the cover portion and the enclosure portion and is exhausted
wherein the cover portion is supported to be movable relative to the enclosure portion such that vibration generated during operation of the working device causes the cover portion to move, resulting in airflow into the airflow passage from the first vent and the second vent and airflow out of the airflow passage to the first vent and the second vent.

12. The working device according to claim 11,
wherein the housing accommodates a fan driven by the drive unit,
wherein the fan sucks fan air from a third vent provided in the housing, and
wherein the fan air is exhausted from a fourth vent provided in the enclosure portion.

13. The working device according to claim 11,
wherein the cover portion is supported so as to be movable at least in an axial direction of the drive unit with respect to the case, and
wherein movement of the cover portion in the axial direction causes a change in a volume of the airflow passage, which in turn causes air to flow into the airflow passage from the first vent.

14. The working device according to claim 11, further comprising a board having an LED element, the board being supported in the case so as to be movable together with the cover portion at least in an axial direction of the drive unit with respect to the case,
wherein movement of the board in the axial direction causes a change in a volume of the airflow passage, which in turn causes air to flow into the airflow passage from the first vent.

15. The working device according to claim 14,
wherein an energizing member for energizing the board on a side of the case is provided between the case and the board, and
wherein the board is configured to compress the energizing member due to vibration generated during a working operation, air is sucked from the first vent.

16. The working device according to claim 11, wherein an elastic member is provided between the cover portion and the enclosure portion, which biases the cover portion away from the enclosure portion in an axial direction of the drive unit.

* * * * *